United States Patent
Sivathanu

(10) Patent No.: US 10,810,206 B2
(45) Date of Patent: Oct. 20, 2020

(54) EFFICIENT MULTI-DIMENSIONAL PARTITIONING AND SORTING IN LARGE-SCALE DISTRIBUTED DATA PROCESSING SYSTEMS

(71) Applicant: Microsoft Technology Licensing, LLC, Redmond, WA (US)

(72) Inventor: Muthian Sivathanu, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 619 days.

(21) Appl. No.: 15/624,040

(22) Filed: Jun. 15, 2017

(65) Prior Publication Data

US 2018/0365292 A1    Dec. 20, 2018

(51) Int. Cl.
| | | |
|---|---|---|
| G06F 16/00 | (2019.01) | |
| G06F 16/2455 | (2019.01) | |
| G06F 12/0802 | (2016.01) | |
| G06F 7/08 | (2006.01) | |
| G06F 11/14 | (2006.01) | |

(Continued)

(52) U.S. Cl.
CPC ........ *G06F 16/24554* (2019.01); *G06F 7/08* (2013.01); *G06F 11/1469* (2013.01); *G06F 11/2058* (2013.01); *G06F 11/2069* (2013.01); *G06F 12/0802* (2013.01);

(Continued)

(58) Field of Classification Search
CPC .......... G06F 16/24554; G06F 11/2069; G06F 11/2058; G06F 16/283; G06F 16/2456; G06F 12/0802; G06F 7/08; G06F 11/1469; G06F 2212/60; G06F 2201/80
See application file for complete search history.

(56) References Cited

U.S. PATENT DOCUMENTS

| | | |
|---|---|---|
| 8,370,672 B2 | 2/2013 | Thereska et al. |
| 8,572,091 B1 | 10/2013 | Sivasubramanian et al. |

(Continued)

OTHER PUBLICATIONS

Jindal, et al., "CARTILAGE: Adding Flexibility to the Hadoop Skeleton", In Proceedings of the ACM SIGMOD International Conference on Management of Data, Jun. 22, 2013, 4 pages.

(Continued)

*Primary Examiner* — Usmaan Saeed
*Assistant Examiner* — Paul Kim
(74) *Attorney, Agent, or Firm* — Schwegman Lundberg & Woessner, P.A.

(57) ABSTRACT

Methods, systems, and computer programs are presented for structuring a database to support multiple partitioning orders at the storage layer. One method includes an operation for identifying partitioning fields for a database that is stored distributed across computing devices, where each computing device stores an extent that holds a subset of entries from the database. For each partitioning field, the database entries are stored in extents associated with the partitioning field, the database entries in the extents for the partitioning field being organized based on the value of the partitioning field. Further, the method includes operations for receiving a database query that includes a filter based on values of a selected partitioning field, and for retrieving the data for the database query from one or more of the extents associated with the selected partitioning field. The retrieved data is returned for the database query.

19 Claims, 14 Drawing Sheets

(51) Int. Cl.
*G06F 16/28* (2019.01)
*G06F 11/20* (2006.01)
(52) U.S. Cl.
CPC ........ *G06F 16/2456* (2019.01); *G06F 16/283* (2019.01); *G06F 2201/80* (2013.01); *G06F 2212/60* (2013.01)

(56) References Cited

U.S. PATENT DOCUMENTS

2007/0027860 A1\* 2/2007 Bestgen ............ G06F 16/24544
2012/0054182 A1 3/2012 Gupta et al.
2015/0120652 A1 4/2015 Dittrich et al.
2015/0269239 A1 9/2015 Swift et al.
2017/0132091 A1\* 5/2017 Leshinsky ........... G06F 11/0727

OTHER PUBLICATIONS

Qin, et al., "Beyond Simple Integration of RDBMS and MapReduce—Paving the Way toward a Unified System for Big Data Analytics: Vision and Progress", In Proceedings of Second International Conference on Cloud and Green Computing, Nov. 1, 2012, pp. 716-725.
He, et al., "Boosting Parallel File System Performance via Heterogeneity-Aware Selective Data Layout", In Journal of IEEE Transactions on Parallel and Distributed Systems, vol. 27, Issue 9, Sep. 2016, pp. 2492-2505.

\* cited by examiner

EFFICIENT MULTI-DIMENSIONAL PARTITIONING AND SORTING IN LARGE-SCALE DISTRIBUTED DATA PROCESSING SYSTEMS

TECHNICAL FIELD

The subject matter disclosed herein generally relates to methods, systems, and programs for efficient storing of data in large databases.

BACKGROUND

There are two common types of database queries: online transaction processing (OLTP) queries and ad hoc queries. The OLTP query is a specific lookup to the database, such as when searching for an item in an ecommerce application. In this case, database indexing is an effective method to retrieve the specific database entry.

The ad hoc query is a query that cannot be determined prior to the moment the query is issued, and it is created in order to get information when the need arises. The ad hoc query is usually requested to get intelligence from the data. Typically, ad hoc queries have to read many database entries, sometimes the whole database, such as when searching for a maximum value for a database field, searching for entries having a field value within a certain range, etc. In this case, indexing is usually of little help, as the data may be scattered across the database.

The ad hoc queries typically result in a large consumption of computer resources, such as a large number of disk I/Os (inputs/outputs) and a large amount of network traffic. For example, ad hoc queries in petabyte-scale data sets may run for several hours because the entire database data has to be scanned. Partitioning and sorting the data in one column may speed up queries that filter or join on that column, but in current database implementations, only one partitioning or sorting strategy (for one database field) may be employed for a given database.

To support multiple partitioning orders or sorting orders on the same data, current solutions have to duplicate the data at the higher level, which results in two prohibitive costs: the cost of additional storage space (e.g., three times the amount of storage for three partitioning orders), and the additional complexity and performance cost of keeping more copies consistent in the face of updates.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
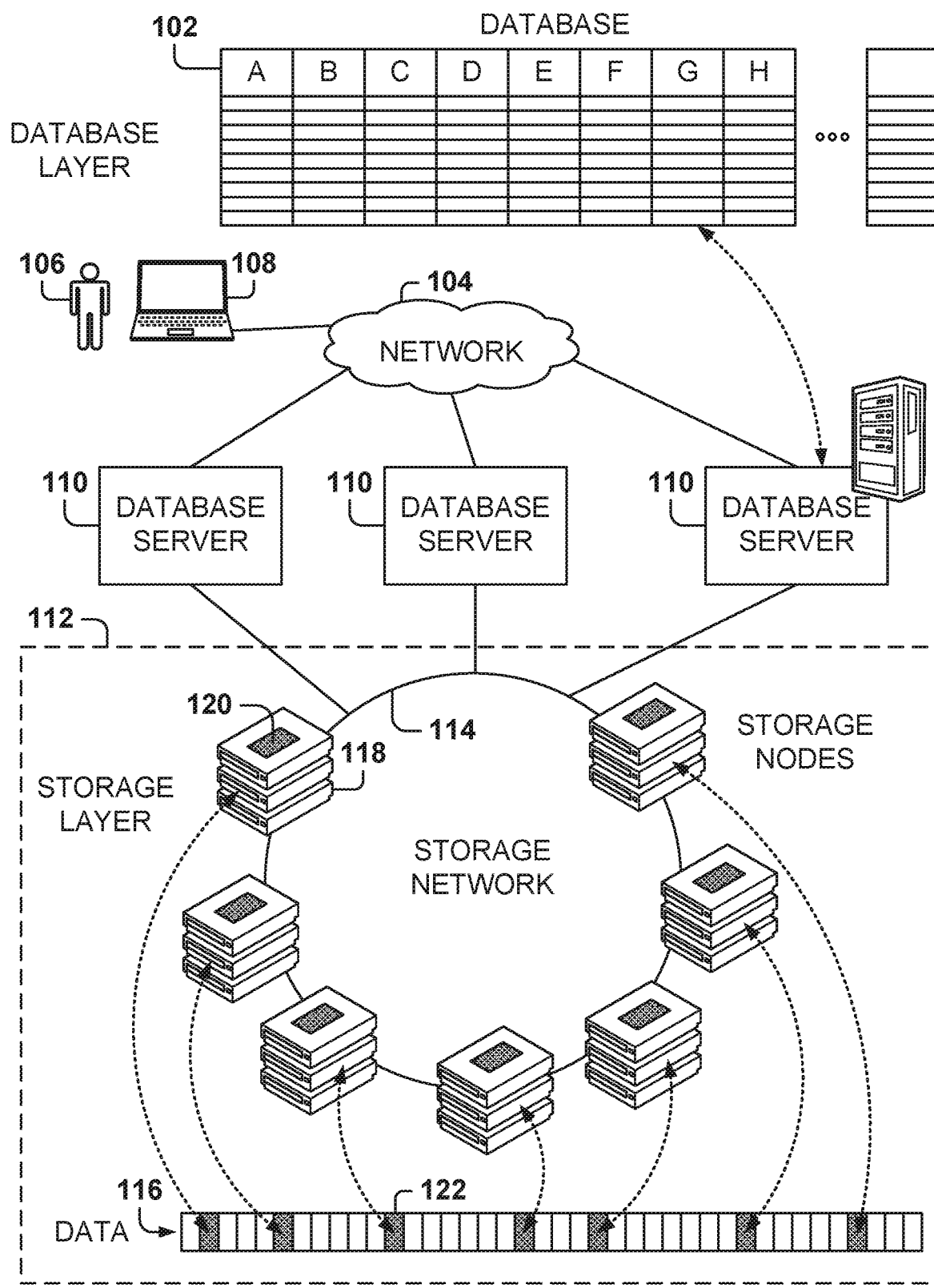
FIG. 1 illustrates a storage architecture, according to some example embodiments.

Example methods, systems, and computer programs are directed to structuring a database to support multiple partitioning and sorting orders at the storage layer. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Embodiments presented herein provide for mechanisms by which multiple simultaneous sorting and partitioning strategies can be employed on the same data, but without paying an extra cost in storage or performance. These solutions enable a large fraction of big data queries, on petabyte-scale databases, to run orders of magnitude faster and to use many fewer resources.

Embodiments presented herein modify the typical replication methodology in existing storage systems to provide for a different partitioning order for each replica of the database. This way, multiple partitioning fields may be supported without having to store multiples copies of the database. The logical replication is managed at the storage layer instead of at the database layer. The new storage layout technique is based on super-extents (logical partitions of the database) and chained intra-extent bucketing (inter-linked sorting strategy among the extents from the different partitioning fields), that enables recovery of a storage block from a set of storage blocks in a different heterogeneous replica sorted or partitioned along different dimensions, while guaranteeing the same availability and reliability as with physical replication (e.g., three-way replication).

Further, a new data block is defined, the super-extent, which divides the database into blocks of data, and each super-extent is managed separately to enhance data access and the recovery from machine failure.

One general aspect includes a method including an operation for identifying a plurality of partitioning fields for a database that is stored distributed across a plurality of computing devices. Each computing device from the plurality of computing devices stores an extent that holds a subset of entries from the database. For each partitioning field, the database entries are stored in a plurality of extents associated with the partitioning field, where the database entries stored in the plurality of extents for the partitioning field are organized based on the value of the partitioning field in each database entry. The method further includes an operation for receiving a database query that includes a filter based on values of a selected partitioning field from the plurality of partitioning fields, and an operation for selecting one or more extents of the plurality of extents associated with the selected partitioning field based on the filter and based on values of the partitioning field associated with each extent. The method further includes operations for retrieving the data for the database query from the selected extents, and for returning the retrieved data for the database query.

One general aspect includes a system including a memory including instructions and one or more computer processors. The instructions, when executed by the one or more computer processors, cause the one or more computer processors to perform operations including: identifying a plurality of partitioning fields for a database that is stored distributed across a plurality of computing devices each computing device from the plurality of computing devices storing an extent that holds a subset of entries from the database; for each partitioning field, storing the database entries in a plurality of extents associated with the partitioning field, the database entries stored in the plurality of extents for the partitioning field being organized based on a value of the partitioning field in each database entry; receiving a database query that includes a filter based on values of a selected partitioning field from the plurality of partitioning fields; selecting one or more extents of the plurality of extents associated with the selected partitioning field based on the filter and based on values of the partitioning field associated with each extent; retrieving the data for the database query from of the selected extents; and returning the retrieved data for the database query.

One general aspect includes a non-transitory machine-readable storage medium including instructions that, when executed by a machine, cause the machine to perform operations including: identifying a plurality of partitioning fields for a database that is stored distributed across a plurality of computing devices each computing device from the plurality of computing devices storing an extent that holds a subset of entries from the database; for each partitioning field, storing the database entries in a plurality of extents associated with the partitioning field, the database entries stored in the plurality of extents for the partitioning field being organized based on a value of the partitioning field in each database entry; receiving a database query that includes a filter based on values of a selected partitioning field from the plurality of partitioning fields; selecting one or more extents of the plurality of extents associated with the selected partitioning field based on the filter and based on values of the partitioning field associated with each extent; retrieving the data for the database query from the selected extents; and returning the retrieved data for the database query.

FIG. 1 illustrates a storage architecture, according to some example embodiments. A database 102 includes a plurality of database entries (e.g., rows in the database table), and each entry includes a plurality of fields (e.g., columns of the database table illustrated as A, B, C, etc.). The database table 102 is a logical representation of the data 116 which is stored in a plurality of storage nodes 118. This logical representation of the database is referred to herein as the "database layer," the "logical layer," or the "logical representation."

One or more database servers 110 manage the database and the access to the database by users 106 utilizing respective client devices 108, which access the database via a network 104.

In some example embodiments, a storage network 114 interconnects the storage nodes 118 and the database servers 110, but other embodiments may utilize other network configurations. The plurality of storage nodes 118 and the storage network 114 comprise the storage layer 112 that stores the data represented in the database layer. In some example embodiments, the data 116 of the database is stored in logical files, which are divided into blocks of data referred to as extents 122 (e.g., 64 GB in size, but other standard sizes are also possible).

In some example embodiments, each extent 122 is replicated multiple times, and each extent replica 120 is stored in a different storage node 118. This way, if a storage node 118 fails, data recovery is performed by using free space on another existing storage node, or by bringing up a new storage node, and copying the data from one of the replicas.

Many of these datasets are laid out in file systems, such as HDFS, GFS or ADLS. The data is typically spread across several machines, and they are partitioned into smaller extents. In the example embodiment of FIG. 1, each extent is saved three times, but other storage systems may save a different number of copies. For example, some storage system utilizing ADLS store the data three times for fault tolerance and high availability. Thus, replication takes place at the storage layer 112.

One way to speed up ad hoc queries is to improve the physical layout of the data. Physically, if the records are laid out in such a way that all records pertaining to a first value (e.g., CNN.com clicks) are stored first, followed by all records pertaining to a second value (e.g., Microsoft.com clicks), followed by all records pertaining to a third value (e.g., Yahoo.com clicks), etc., then queries based on selections from one of these values may be satisfied quickly.

For example, if the query requests "All clicks for pages in CNN.com," then the database server 110 knows the extents that contain data for this request, so the database server 110 does not have to read the complete database, and may read only one percent % of the extents.

Some database techniques are aimed at speeding data access. Partitioning refers to dividing the data among extents (e.g., machines), and clustering refers to the ordering of records within the partition. For example, if data is clustered by a particular key, then, in the partition that is responsible for the range A to AB, not only will all the records pertaining to that range be stored in the extents, but within that range all the records will also be sorted by the clustering key.

Many times, the default is to use partitioning by temporal order. As records are added to the file in timestamp order, new extents are created, and the extents are mapped to random machines. But other partitioning schemes are possible. For example, a hash may be done on a particular field, such as a user identifier (ID) field, and a record may be mapped based on a mod hash of that field. For example, if there are one thousand machines to store the data, a hash is built, and a mod one thousand done to get the machine ID.

Figure 2:
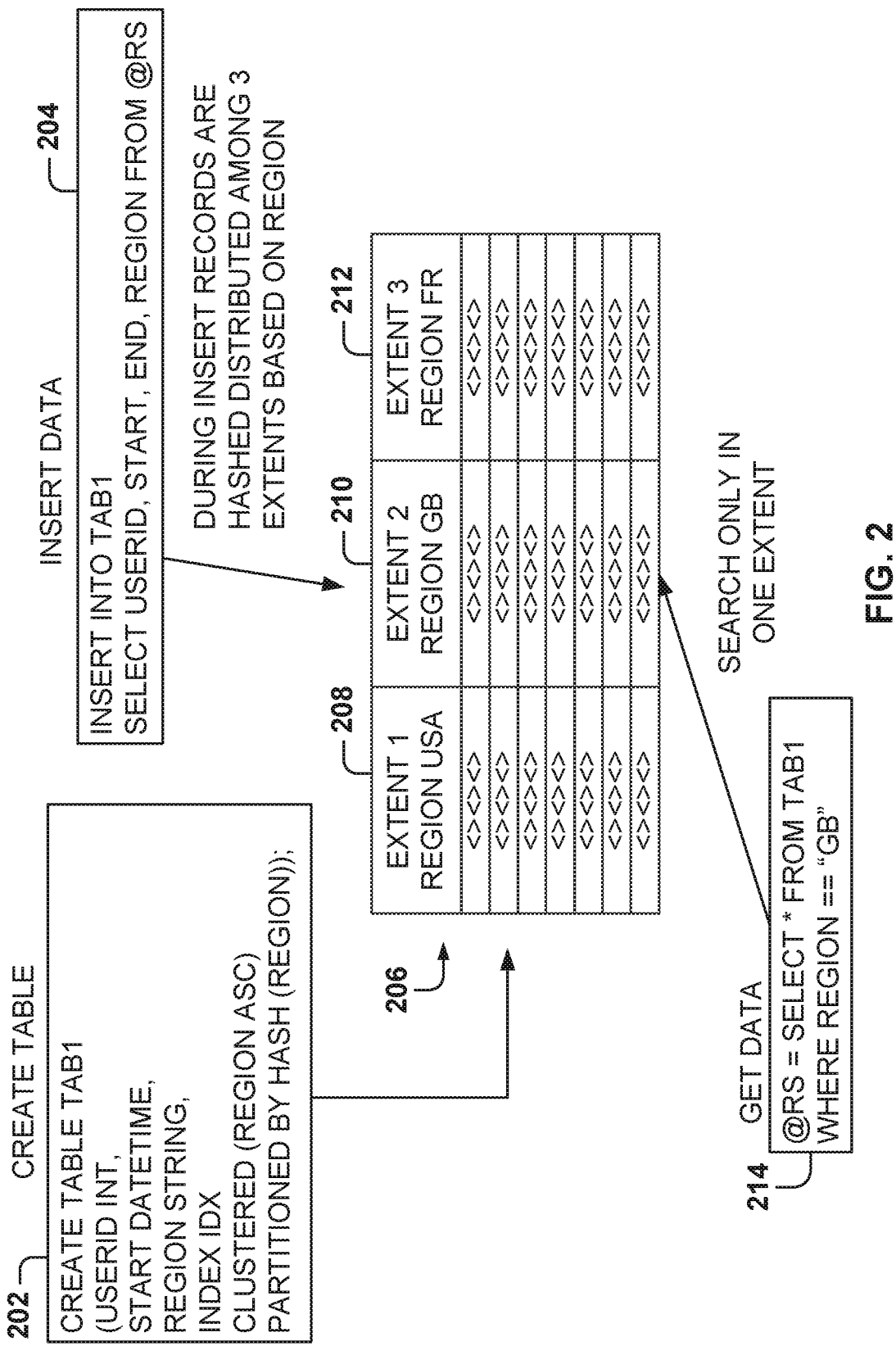
FIG. 2 illustrates partitioning by range in order to accelerate filtering, according to some example embodiments.

FIG. 2 illustrates partitioning by range in order to accelerate filtering, according to some example embodiments. Besides hash partitioning, there is also range partitioning. If a field is partitioned by range (e.g., alphabetically), then values within a range will be stored in the corresponding partition (e.g., entries with values starting with A to AB go to one partition). When a new record is added, depending on the value of the field, the record is mapped to a particular machine responsible for that range.

The problem with database design for ad hoc queries (e.g., for online analytics) is that it may be difficult to select the best partitioning key, as there may be several partitioning keys that would be helpful to speed up queries. The designer has to choose one partitioning key, while there may be five different types of queries that may be best served by having five different types of keys. Any query that filters or joins on the selected column will greatly benefit, but all other queries will be slow.

In the example of FIG. 2, a database table 206 is created with the following command 202:

```
CREATE TABLE Tab1 (UserId int, Start DateTime,
Region string,
INDEX idx CLUSTERED (Region ASC)
PARTITIONED BY HASH (Region));
```

In this example, the Region field may have one of three values: USA, GB, or FR. Data may be added with the following command 204:

```
INSERT INTO Tab1
SELECT UserID, Start, End, Region From @rs
```

As the records are inserted, they are distributed among three extents 208, 210, and 212, based on the value of the Region field.

If a search is received for data from a region, then the response to the query will be quick. For example, a get command may be requested with the following command 214:

```
@rs=SELECT*FROM Tab1 WHERE
    Region=="GB"
```

The database has to search the extents associated with the USA region, but not the extents for the other regions.

Figure 3:
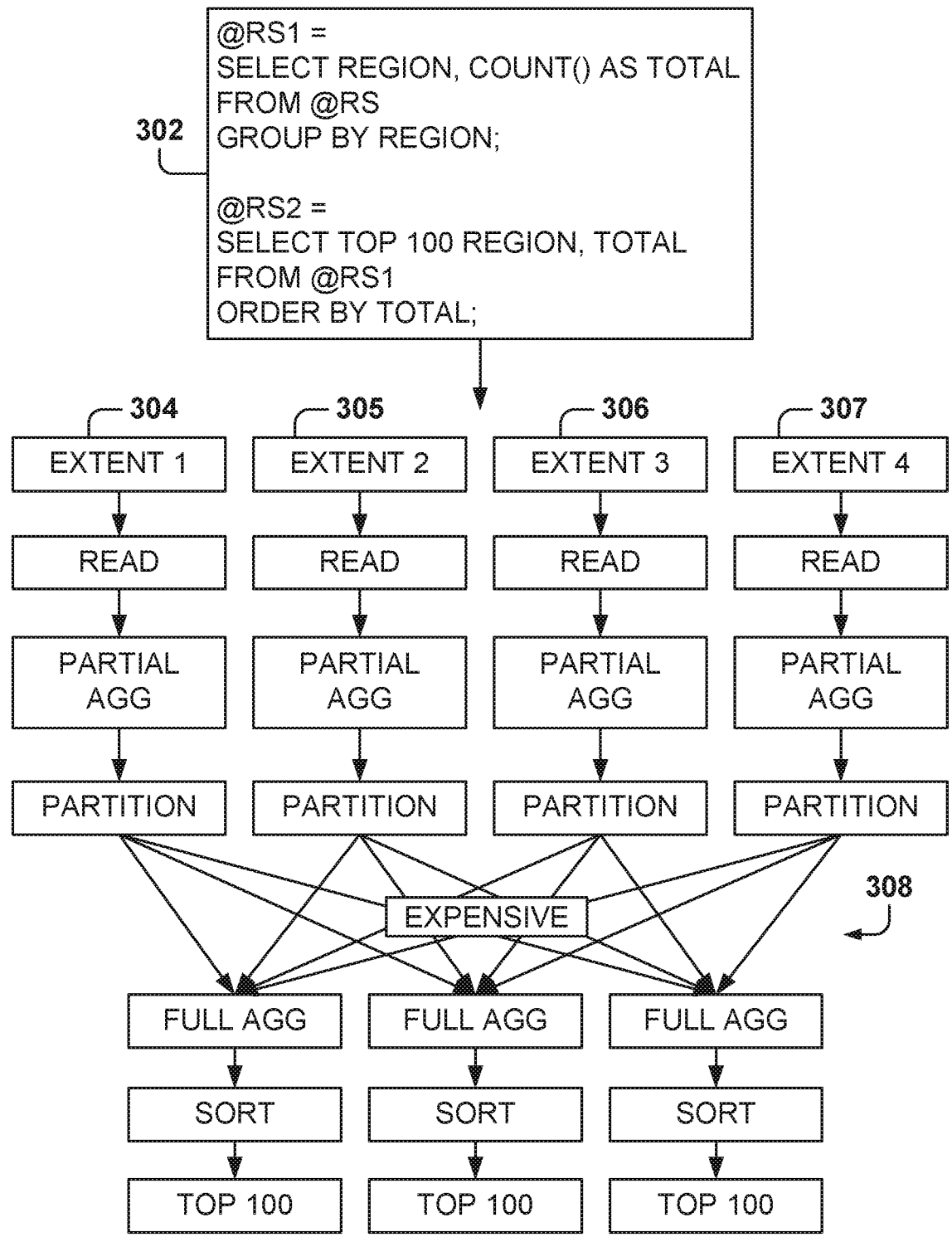
FIG. 3 shows cross-extent shuffling without collocation, according to some example embodiments.

FIG. 3 shows cross-extent shuffling without collocation, according to some example embodiments. Another factor influencing data retrieval is network cost. For example, a user enters the following query 302:

```
@rs1 =
SELECT Region, COUNT( ) AS Total
FROM @rs
GROUP BY Region;
@rs2 =
SELECT TOP 100 Region, Total
FROM @rs1
ORDER BY Total;
```

The query 302 is to calculate the top 100 values per region. Other queries may select the average click time for a region, the median click time for a region, etc. There are four extents 304-307 without collocation of data; e.g., the data for any entry may be located in any extent. When the query is received, each of the extents has to read its data, do a partial aggregation by region of the data, partition the data, and then work with the other extents to perform 308 a full aggregation of data by region, sort the results, and generate the top 100 values for each region.

For example, one machine would take responsibility for one region, and two other machines would take responsibility for the other two regions. The records have to be exchanged among the different machines, which results in a lot of network traffic and an expensive use of network resources, and is also expensive in regard to disk I/O.

Figure 4:
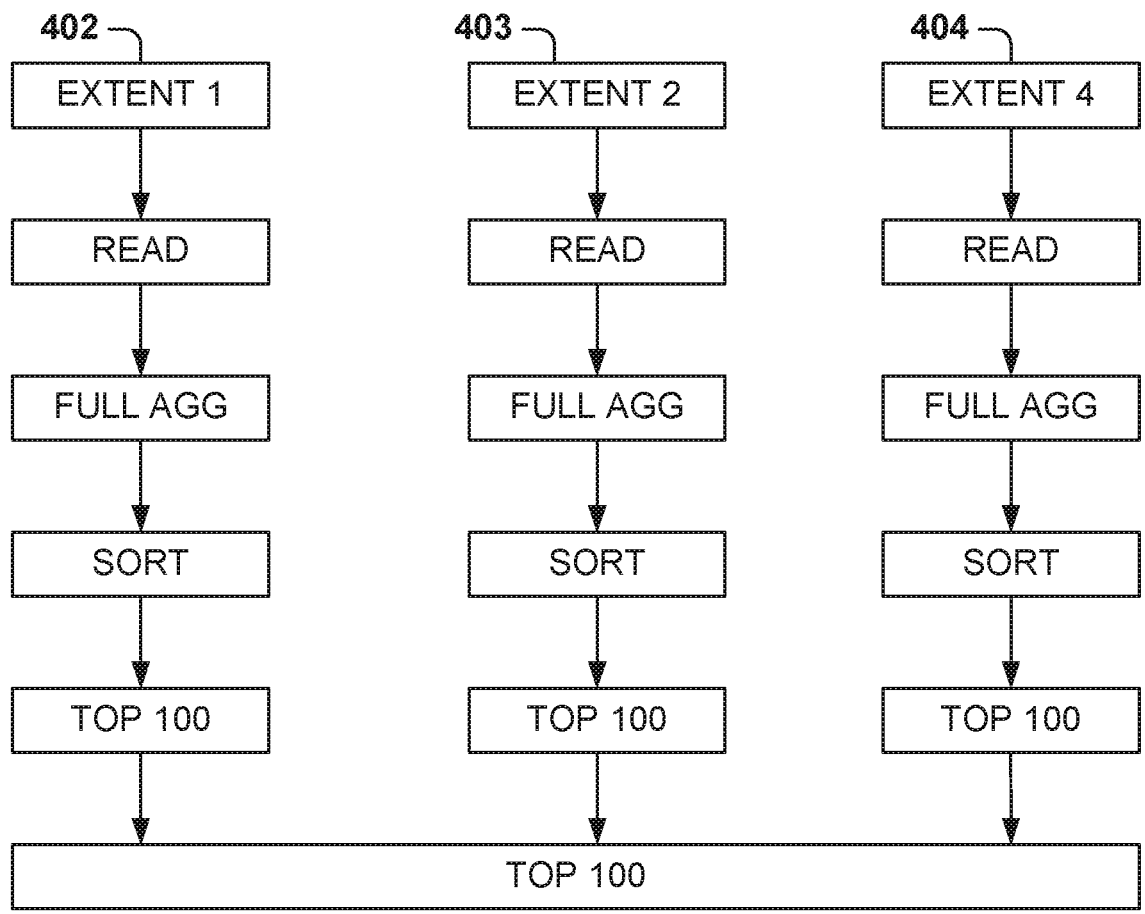
FIG. 4 shows the elimination of cross-extent shuffling when using collocation, according to some example embodiments.

FIG. 4 shows the elimination of cross-extent shuffling when using collocation, according to some example embodiments. In this case, the extents are partitioned by region, and when the same query 302 is performed, the machine from each extent 402-404 performs its own reads, full aggregation of the data, sorting, and selection of the top 100 entries, without incurring the cost of having to exchange data among machines. Once the top 100 values per region have been found, one machine may calculate the top 100 values for all the regions.

Therefore, proper partitioning may accelerate query responses by several orders of magnitude. However, partitioning by just one field may not be very useful in practice, because there may be several fields that are commonly used for ad hoc queries. The database designer has to select one field for partitioning, and the queries associated with that field may be fast, but other queries associated with other fields will be slow.

Figure 5:
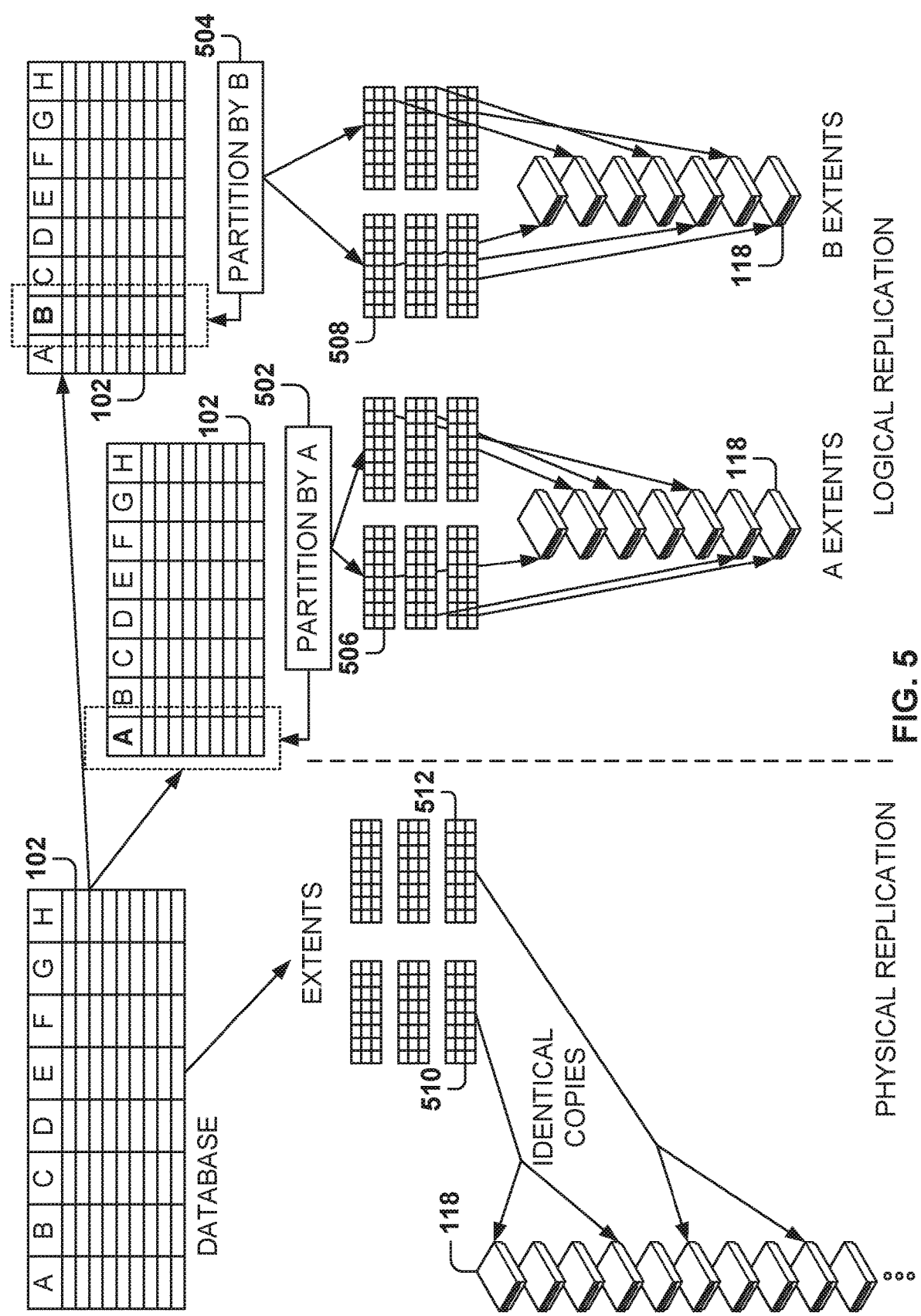
FIG. 5 illustrates the differences between physical replication and logical replication, according to some example embodiments.

FIG. 5 illustrates the differences between physical replication and logical replication, according to some example embodiments. The goal to accelerate response times to multiple ad hoc queries is to support multiple partitioning strategies without requiring a large amount of additional computing resources. For example, if there are only three or four meaningful columns for filtering database queries, supporting simultaneous multiple partitioning on different sorting fields will accelerate response times to search queries for all those partitioning fields. Some databases may require even more than 3 partitioning orders (such as 5 or 7) and logical replication may also be utilized for these databases.

The problem with current solutions is that the replication has to be performed at a high level, the database layer, which means supporting multiple physically different tables. For example, with a table having ten columns, if four partitioning fields are desired, four different database tables have to be maintained and stored separately, each table partitioned by a different field. When a query is received, then the proper table will be selected based on the filtering field identified in the query. Of course, having four tables quadruples storage cost, as well as computer resources required to maintain multiple consistent storage tables.

Embodiments presented herein reorganize the storage layer to take advantage of the multiple replicas used for high availability. The storage layer is tightly integrated with the database logic, the database engine, and the query engine, to support multiple partitioning strategies at low cost. Each replica of the storage layer is now a logical copy instead of an exact physical copy, and each replica is then organized based on one of the fields of the database.

When utilizing physical replication, the database 102 is divided into a plurality of extents (e.g., 510 and 512), where each extent includes a plurality of database entries. Each extent is then stored in a storage node 118 multiple times (two times in this example), and all the copies are identical as stored.

When utilizing logical replication, multiple partitioning fields are identified. In the example of FIG. 5, two partitioning fields are identified: A and B. As used herein, a partitioning field is a field of the database that is used to organize a replica of the database at the storage layer. For each partitioning field, extents are created that organize the data based on the values of the respective partitioning field.

For field A, extents 506 are created based on a partitioning 502 of the database according to a criterion associated with field A. For example, each extent covers a range of values for the values of field A in the database entries. It is noted that the entries in the extent do not have to be sorted according to the values of field A, although, in some embodiments, the data may be sorted by field A values. For example, one extent may include entries with values of A between 20 and 30, and the entries may be stored in any order.

Similarly, for field B, the extents 508 are created based on a partitioning 504 of the database according to some criterion associated with field B. Therefore, when using logical replication, the extents 506 associated with field A are not identical copies of the extents 508 associated with field B.

With physical replication, to keep multiple tables at the database layer is expensive because it is necessary to keep each copy consistent with the other ones. With logical replication, by piggybacking on the storage application, multiple sorting is gained at almost no cost because the storage layer already has all the machinery required to ensure consistency. Further, by piggybacking on the storage application, it is possible to avoid requiring additional storage space to support the multiple partitioning orders. In effect, if the storage system performs three-way replication, it is three times cheaper, from a storage cost perspective, to keep the same number of partitioning/sorting orders. From the storage point of view, it is basically one file. For the database, it looks like three logical files, each of which is partitioned by a different criterion.

Analysis of queries of many databases show that most queries are sorted on a few fields, such as from two to five fields. Therefore, supporting up to five sorting fields will cover a large fraction of all query workload. From the point of view of the user, the database runs considerably faster for most workloads.

In addition, by supporting several partitioning orders, it is also possible to pre-compute some statistical values. The storage layer already processes incoming data, such as for checksumming. In some example embodiments, for an extent replica sorted by one column, some statistical values are calculated on one or more fields, such as minimum, maximum, count, etc. The storage of statistical values adds a small storage overhead, but some queries may be calculated much faster, such as getting an average value for a certain filter. For example, a request to obtain the average user stay on a web page for a certain domain may be requested as:

```
SELECT AVG(ClickDuration) FROM ClickData WHERE
Domain == "cnn.com."
```

This command will be performed quickly by combining the pre-computed information for the extents storing data for the requested domain, when the domain is one of the sorting fields. Further, this data is composable across multiple extents because the average of data from several extents is easily calculated based on the partial averages and the number of entries in each extent. Because the data is partitioned by domain, it is only necessary to look at a small portion of extents, such as 0.1% of the extents on a database with a large number of different domains.

In some example embodiments, because of the pre-computed aggregates, it is not necessary to look at that 0.1%; it is only necessary to look at the metadata for that 0.1% of extents, which may be stored on flash memory for faster retrieval. Therefore, is not necessary to do any disk I/O.

Figure 6:
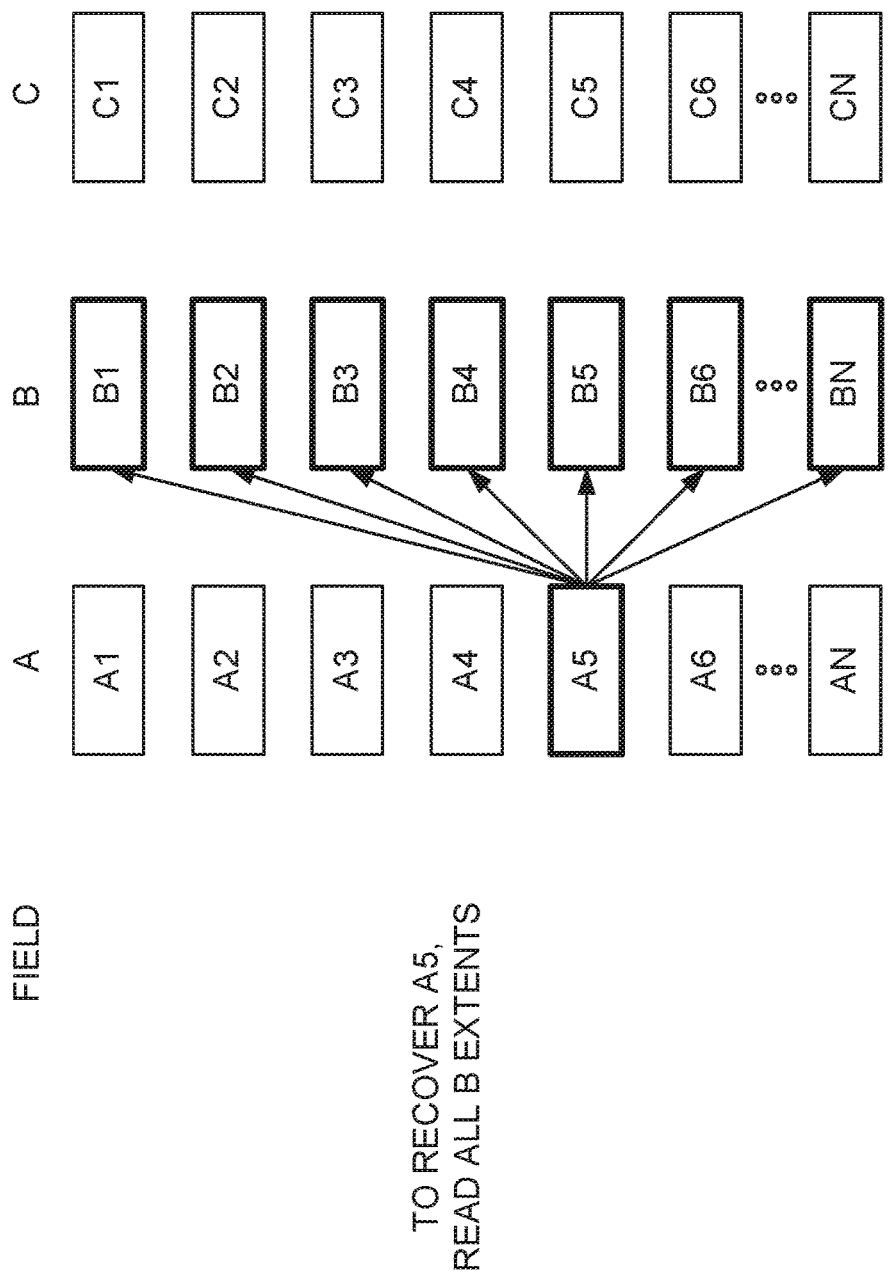
FIG. 6 illustrates data distribution across extents, according to some example embodiments.

FIG. 6 illustrates data distribution across extents, according to some example embodiments. One challenge of logical replication is that the method piggybacks on a mechanism that was meant for something else, to provide high availability. If a machine fails, the storage layer still has to efficiently recover the lost copy from another replica. With physical replication, recovery of a lost extent is straightforward, because all that is needed is to make an exact copy from another replica (e.g., 64 megabytes). However, with logical replication, there is not an exact copy of an extent that is lost. If we have replicas organized differently at the storage layer, then the copies of the different extents are not exact replicas.

In the example of FIG. 6, there are three partitioning fields: A, B, and C. For field A, extents A1 to An are created; for field B, extents B1 to Bn are created; and for field C, extents C1 to Cn are created. This way, for the same storage cost, three distinct partitioning orders are supported.

If extent A5 is lost, to recover A5 from the second replica partitioned by B, all the B extents have to be read to find the data that was stored in A5. That is, if A5 keeps records for one particular range of values of A, since the B extents are partitioned by the B field, the data for that range of A values may be found in several of the B extents. This makes recovery under the logical partitioning strategy expensive, and that is why additional mechanisms are used to overcome this obstacle, as illustrated below with reference to FIGS. 7A and 7B.

Figure 7A:
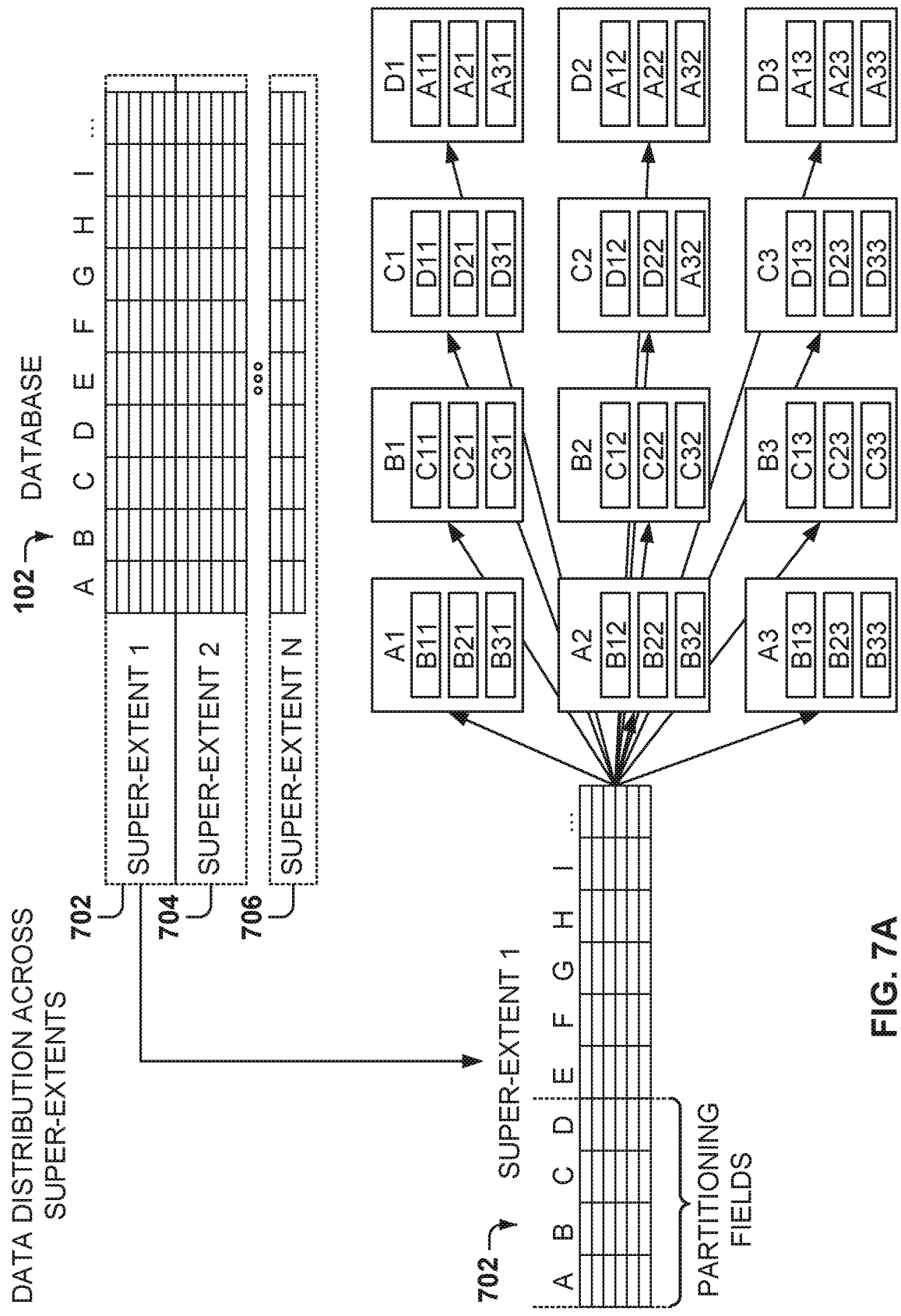
FIG. 7A illustrates the data distribution across super-extents, in accordance with some example embodiments.

FIG. 7A illustrates the data distribution across super-extents, according to some example embodiments. In some example embodiments, logical replications includes defining super-extents. A super-extent includes a fraction of the database table 102, and each super-extent includes a plurality of extents. For example, a super-extent may include 100 extents, but other ranges are possible, such as from 10 to 1,000 extents. It is noted that each super-extent may hold any value for any of the fields in the database.

In the example of FIG. 7A, the database table 102 is divided into super extents: super-extent 1 702, super-extent 2 704, super-extent N 706, etc. It is noted that any partition of database entries may be performed for creating a super-extent, not just contiguous (e.g., entered in sequential order) entries of the database table 102, although in some cases, a super-extent may be built based on the entry timestamp.

The sorting/partitioning of the data is then performed per each super-extent, and the data aggregated at the overall level by combining the data from the super-extents. For example, recovery after a machine failure may be performed within the super extent because the data for the recovery is known to be found in the replicas used for the super-extent. More details are provided below with reference to FIG. 7B for the recovery process when utilizing super-extents.

In one example, there are 1,000 records in the database, which is being organized in extents holding 10 entries each. Without using super-extents, there are 100 extents. Further, one copy of the data is partitioned by column A, a second copy is partitioned by column B, a third is partitioned by column C, and a fourth one is partitioned by column D. A recovery of an extent for column B is to be performed, where the extent holds values 10 to 20 for column B. In this case, it is necessary to read all 100 extents in column A because these records may be in any of the extents for column A.

In another implementation, super-extents are created that hold 10 extents each. Now, to recover the record for column B, only 10 extents have to be read, instead of 100 extents.

In some example embodiments, recovery may be made faster by adding chained intra-extent sorting, which is sorting the data in the extents partitioned by one field based on another partitioning field. In FIG. 7A, this is represented by the blocks within each extent. For example, extents Ai hold data partitioned according to field A, and each extent Ai sorts the database entries based on the values of field B.

It is noted that the values in extent A1 may be limited to a certain range for column A, but instead of sorting the entries in the extent by column A, the values are sorted/partitioned by column B. Extent A1 includes some values from extent B1, referred to as B11, some values from extent B2, referred to as B21, and some values from extent B3, referred to as B31. It is noted that although blocks B11, B21, and B31 are shown having the same size, each of the blocks B11, B21, and B31 may include a different number of entries, and the blocks B11, B21, and B31 may also be empty.

Similarly, the values of the extents from column B are sorted by the values from column C, the values of column C are sorted by the values from column D, and the values of column D are sorted by the values from column A. Of course, the sorting orders on the different partitioning fields are organized so each partitioning field has another corresponding partitioning field with values sorted by the partitioning field to allow recovery from any extent. In this case, the inter-extent sorting is different from the intra-extent sorting. For example, in the partitioning order by column B, the inter-extent sorting within a super-extent is by column B, and the intra-extent sorting within each such extent is by column C.

One of the problems with multiple sorting orders is that one write may result in many disk I/Os. For example, assume that there are 100 records and that columns A-C hold values ranging from 1 to 100, where the values are uncorrelated. A value of 1 in column A may map to a value of 15 in column B and to a value of 75 in column C. This means that sorting by column A will result in random orders for values in columns B and C.

In one example, there is a copy sorted by column A, resulting in 10 extents. The first extent has records that contain values of 0 to 10 for column A, the next extent has values 10 to 20, the next extent has values 20 to 30, and so on. The values for columns B and C could be any value in the first extent. Column B could have values such as 51, 62, 23, 9, 78, etc.

An update to the database is received, such as adding 10 new entries sorted by column A, which are records 101 to 110. With physical replication, all that is needed is to add the same ten records in all copies. The cost of writing these 10 records is 10 times 3. However, with logical replication, because the second copy is sorted by column B, when records 101 to 110 are added to column A, their B values could be within any range. There could be one record in the first extent, one record in the second extent, and so on. This means that adding one extent results in updating 10 other extents in the other sort orders.

In some example embodiments, the incoming I/Os are funneled through a solid-state drive (SSD) (flash memory), and a plurality of entries are cached in the SSD memory until a predetermined number of entries are available to generate a simultaneous write of all the cached entries to disk.

For example, with a super-extent size of 100 extents, ranges are divided among the 100 extents. Until 100 continuous extents are received, the I/Os are stored in the SSD. After that, the 100 continuous extents are written at the same time, and at this time, the data is partitioned for each of the extents. Therefore, 300 extents will be written to disk, the same number of extents that would be written with physical replication.

Figure 7B:
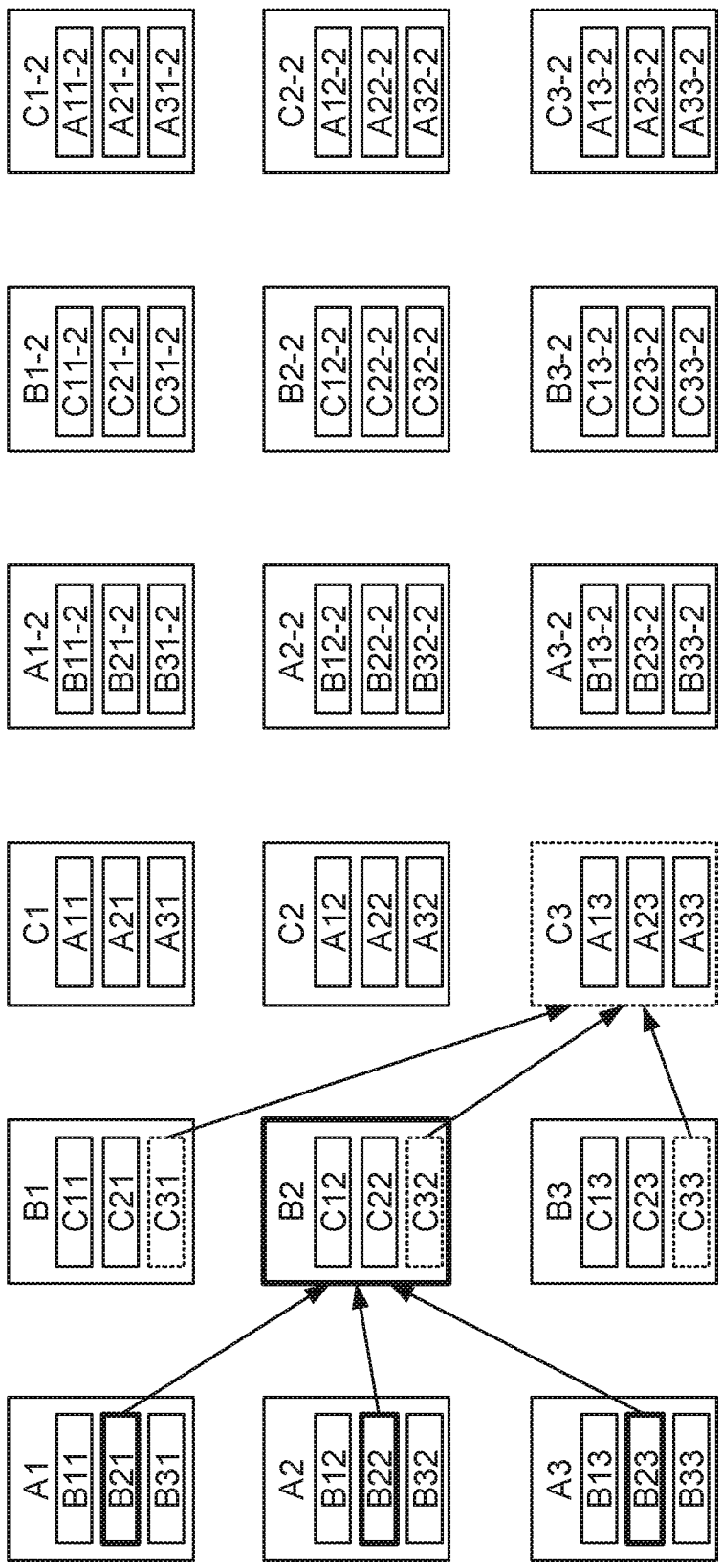
FIG. 7B illustrates the recovery process with super-extents, according to some example embodiments.

FIG. 7B illustrates the recovery process with super-extents, according to some example embodiments. In the example of FIG. 7B, there are three partitioning fields with chained intra-extent sorting. When an extent for a given partitioning field is lost due to failure, recovering the extent requires reading blocks of entries from the extents (not necessarily the whole extent) that are sorted by the given partitioning field.

For example, if extent B2 is lost, recovery requires reading the entries associated with extent B2 in extents A1, A2, and A3. This means reading blocks (A1, B21) (where A1 represents the extent and B21 represents the block within the extent), (A2, B22), and (A3, B23). Since only the blocks have to be transferred, the total transfer of data to recover extent B2 is about the size of extent B2, the same amount of data that would be transferred using physical replication. Similarly, to recover extent C3, blocks (B1, C31), (B2, C32), and (B3, C33) would be read.

In summary, with super-extents and chained intra-extent sorting it is possible to recover a lost extent by transferring the same amount of data as when using physical replication. In addition, by managing the sizing of the intra-extent blocks, the total disk-seek cost is also kept nearly the same, as disk seeks are also a precious resource in the data center.

Figure 8:
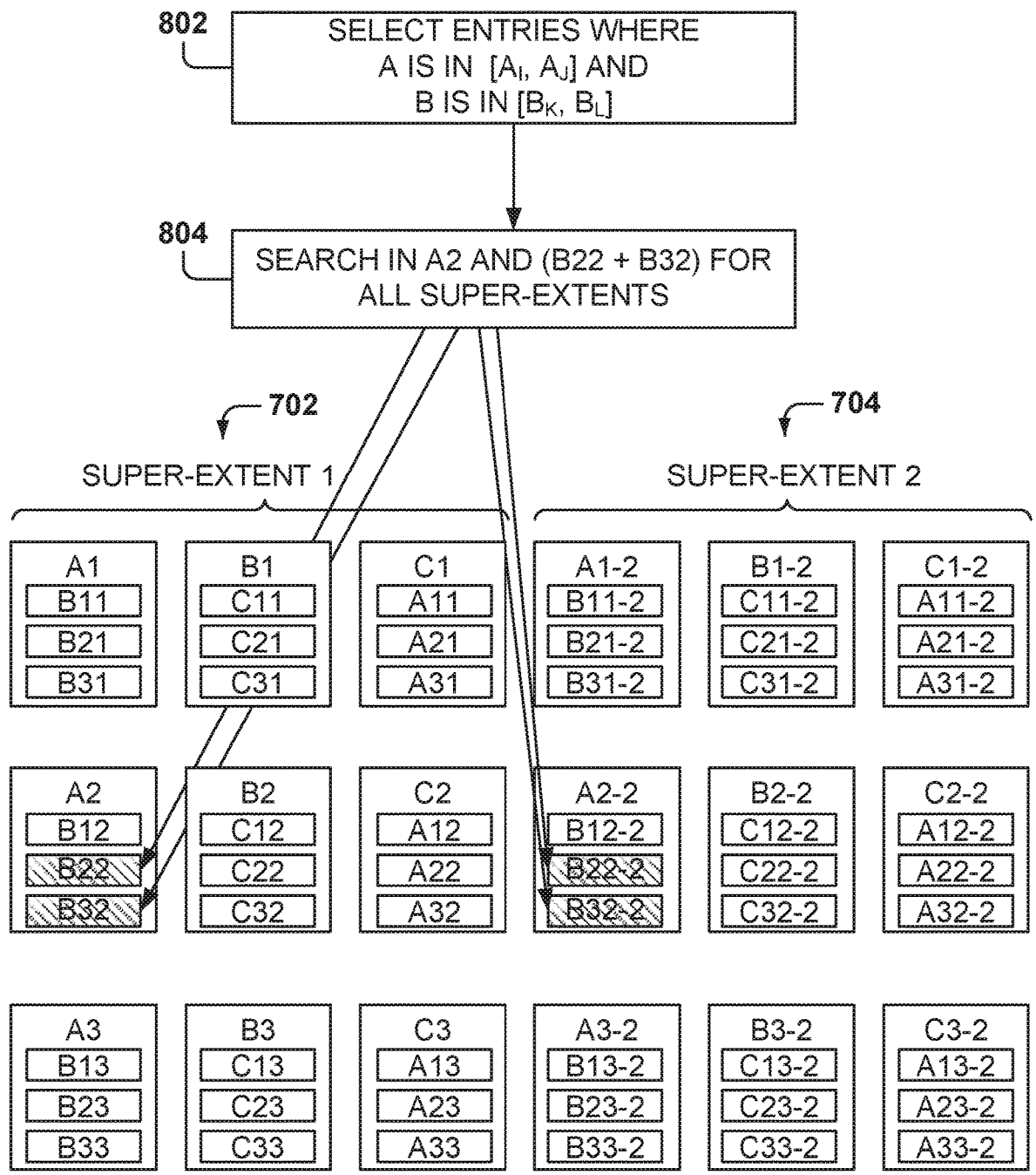
FIG. 8 shows how chained intra-extent sorting accelerates conjunctive filtering, according to some example embodiments.

FIG. 8 shows how chained intra-extent sorting accelerates conjunctive filtering, according to some example embodiments. Chained intra-extent sorting also helps accelerate response time to queries with conjunctive filter predicates, e.g., where the data is filtered based on two predicates on two different columns. If both those columns are partitioning fields, the I/O cost is greatly reduced.

For example, at operation 802, a search query is received to select entries where the values for column A are within a certain range (e.g., $[A_i, A_j]$) and values for column B within another range (e.g., $[B_k, B_l]$). In this example, there are two super-extents 702 and 704.

At operation 804, the extents to satisfy the query are identified. In this example, the range for column A is covered in extent A2, and the range for column B is covered by extents B2 and B3. Since the request includes an AND operation, the data for the query is found in the intersections of extent A2 with extents B2 and B3, which is blocks B22 and B32. Therefore, to satisfy the query, the data for (A2, B22) and (A2, B32) is read from all the super-extents. The result of the request is the combination of the four read blocks: (A2, B22), (A2, B32), (A2-2, B22-2), and (A2-2, B32-2).

This quick access to this data is orders of magnitude faster than in a database with physical replication because, with physical replication, many extents would have to be read to extract the desired information.

Logical partitioning may also accelerate database joins. A join involves merging two tables based on a common key. For example, an employee table with information about the ID, name, age, and start date, could be joined with a manager table which contains employee ID, manager ID, and manager name. Joining these two tables results in a single table containing the employee information plus the manager ID and name. From a data processing perspective, rows of the employee table and the manager table are compared on the common field (employee ID), and when the field values match, the rows are stitched together.

With physical replication (without appropriate partitioning) the two tables have to be read, and each machine has to shuffle the records pertaining to the two tables across the network (similar to the example described above with reference to FIG. 3) based on the hash of the join key. Joining tables that are hundreds of TB in size is very expensive. With multi-partitioning, if the join key is chosen as one of the partitioning fields for one table, the extents will be partitioned by that join key.

If the second table is also partitioned on the same join field, and the database is configured to collocate the two tables, such that extent 1 the first table is on the same machine as extent 1 of the second table, and so on. In this case, the join can proceed without having to do any data shuffle or communication, because each machine has all information about a key range from both tables, and the machine can do a local join. This means that it would be guaranteed that no record of interest in the second file that matches the join key of the first file could be in another machine.

It is noted that, in addition to the join column being chosen as a partitioning order in both tables, the two tables have to be laid out in a coordinated manner. With this collocation, joins may be much more efficient.

Figure 9:
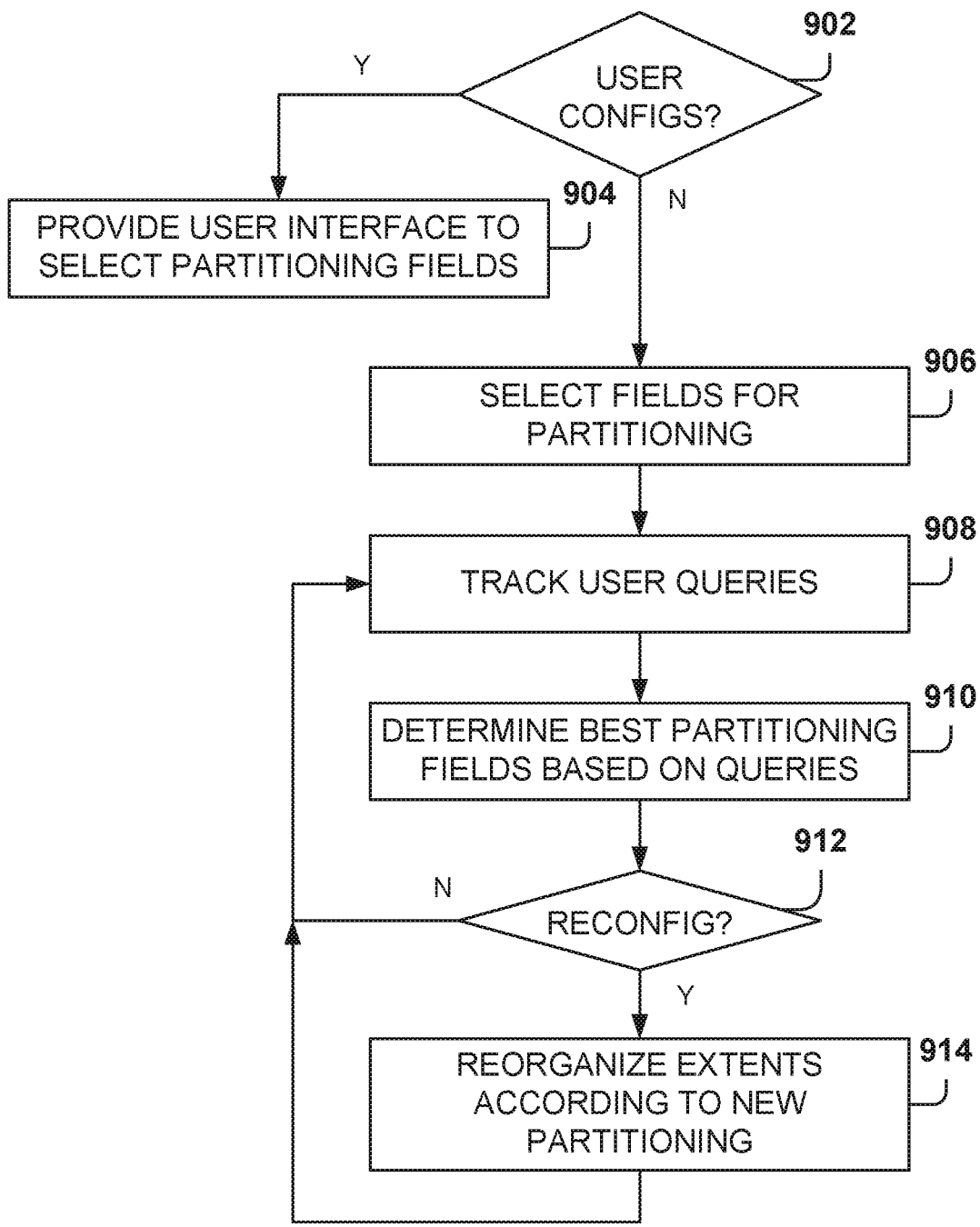
FIG. 9 is a flowchart of a method for selecting fields for sorting, according to some example embodiments.

FIG. 9 is a flowchart of a method for selecting fields for sorting, according to some example embodiments. In some example embodiments, the partitioning fields may be configured by the user. In other example embodiments, the partitioning fields may be determined automatically by the system based on the history of queries received by the database. By analyzing the history of queries, the system optimizes response times by selecting partitioning fields that appear more often in the queries, or the partitioning fields that would result in faster response times.

In the example embodiment of FIG. 9, a check is made at operation 902 to determine if the user has selected to configure the partitioning fields. If the user has selected to configure the partitioning fields, the method flows to operation 904, and to operation 906 otherwise.

At operation 904, a user interface is provided to the user for selecting the partitioning fields. For example, the list of fields in the database is presented to the user and the user may select the desired partitioning fields. In some example embodiments, the number of partitioning fields is preconfigured based on the number of replicas configured for storing the database. In other example embodiments, the user is given the ability to change the number of partitioning fields, which may result in changing the number of replicas created for high-availability, although the number of replicas created for high availability may also be set higher than the number of partitioning fields.

At operation 906, the system may select a plurality of partitioning fields initially. At operation 908, the system tracks the data queries submitted to the system, and at operation 910, the best partitioning fields are determined based on the history of queries. The automated decision factors how often a particular field appears and the cost savings that would be incurred by having the data partitioned by that field. Selecting partitioning fields is based on a cost model and the dynamic run-time profiling of the queries based on collected performance statistics.

At operation 912, a check is made to determine if a reconfiguration of the storage layer of the database is required when new partitioning fields have been identified. If the database needs to be reorganized, the method flows to operation 914, and to operation 908 otherwise.

At operation 914, the storage layer is reorganized by reorganizing the extents according to the new partitioning fields. In some example embodiments, a new copy of the database is created based on the new partitioning fields, and when the transition is complete, the old copies are discarded. Of course, the data has to be reorganized for the new partitioning fields.

In other example embodiments, the system may initialize the database with physical partitioning and then track the most common queries received by the system. Based on the received queries, the system may identify partitioning fields and then change the storage layer from physical partitioning to logical partitioning. Further, it is possible to transition existing databases that use physical replication to use logical replication by changing the storage layer to use logical partitioning.

Figure 10:
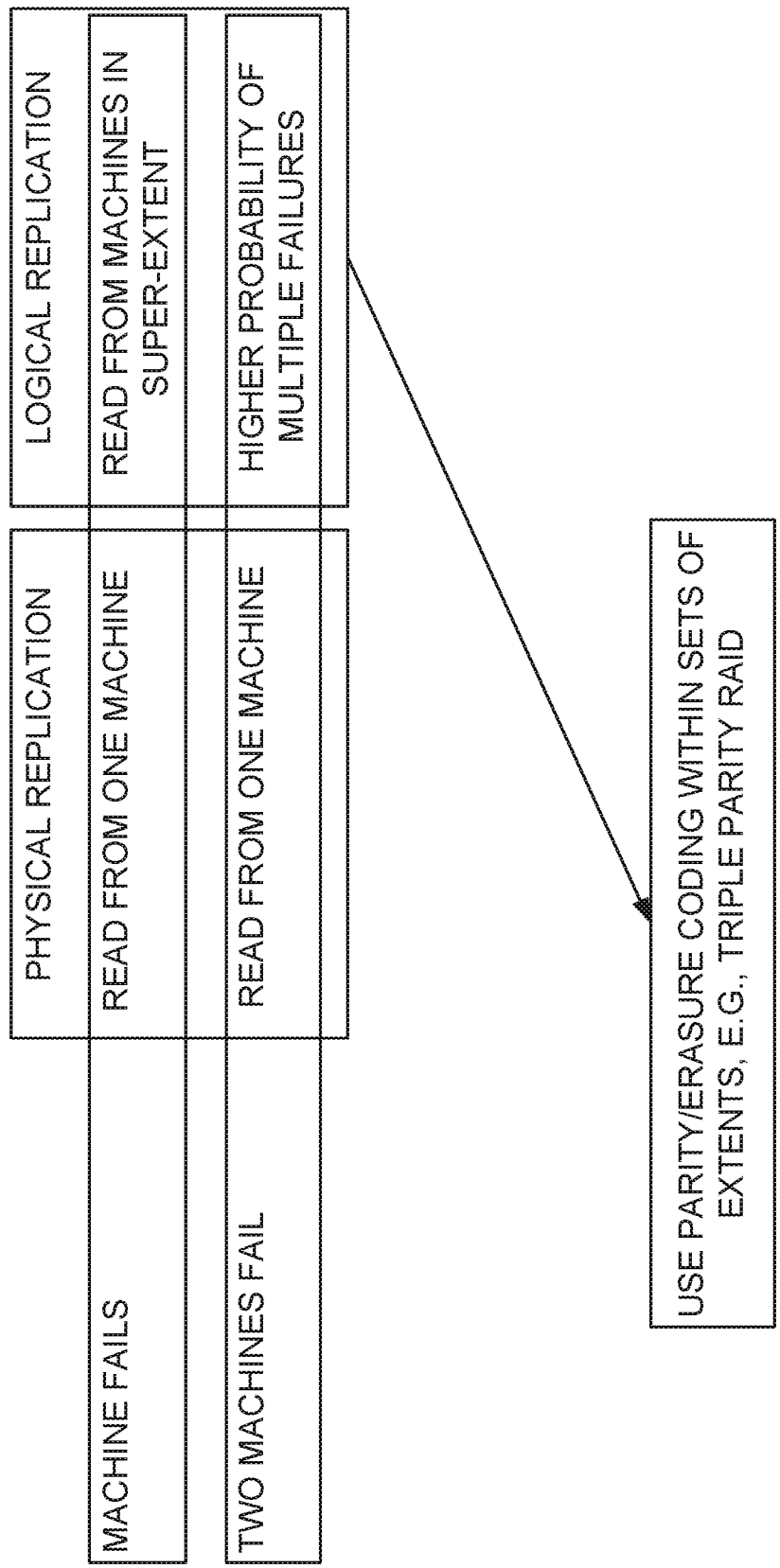
FIG. 10 illustrates the design for availability and reliability, according to some example embodiments.

FIG. 10 illustrates the design for availability and reliability, according to some example embodiments. For file storage, common implementations utilize different RAID (Redundant Array of Independent Disks) schemes, such as RAID 3 through RAID 5, in order to ensure high availability without affecting performance.

One of the concerns with RAID is recovery from multiple failures. For example, if three copies are kept of the data, and one copy is lost, it is possible to recover because there are two other copies. If a second copy is also lost, then risk is increased because there is only one valid copy left. If the third copy is lost, the data is lost. Since data loss is to be avoided, the system aims at reducing the probability of multiple failures happening at the same time.

One goal is to have the same risk of data loss with logical replication as with physical replication. If a storage node fails, the probability of a second storing node failing is denoted as PF when using physical replication.

In a system with logical replication, as for example the embodiment of FIG. 7B, if extent B2 fails, a second failure may occur if any of extents A1, A2, or A3 fail. The probability of double failure is now 3×PF. This means that with logical replication, more extents are needed to recover a lost extent; therefore, the probability of any of those machines failing is higher than the probability of exactly one machine failing.

In some example embodiments, an extra level of redundancy is added to logical replication, similar to the redundancy used in RAID 5, to have an extra level of redundancy and make up for this availability gap. The loss of availability is mitigated by adding another dimension of parity (as in RAID 5) to keep the same availability.

A plurality of parity extents are added to each set of extents. For example, 3 parity extents are added to each set of 100 extents. This means that for a double failure, more than 3 out of the 100 storage nodes have to fail. A 3% increase in storage costs results in about the same reliability as with physical replication. In other example embodiments, a single parity block may be added for every 20 extents, but other combinations are possible.

Figure 11:
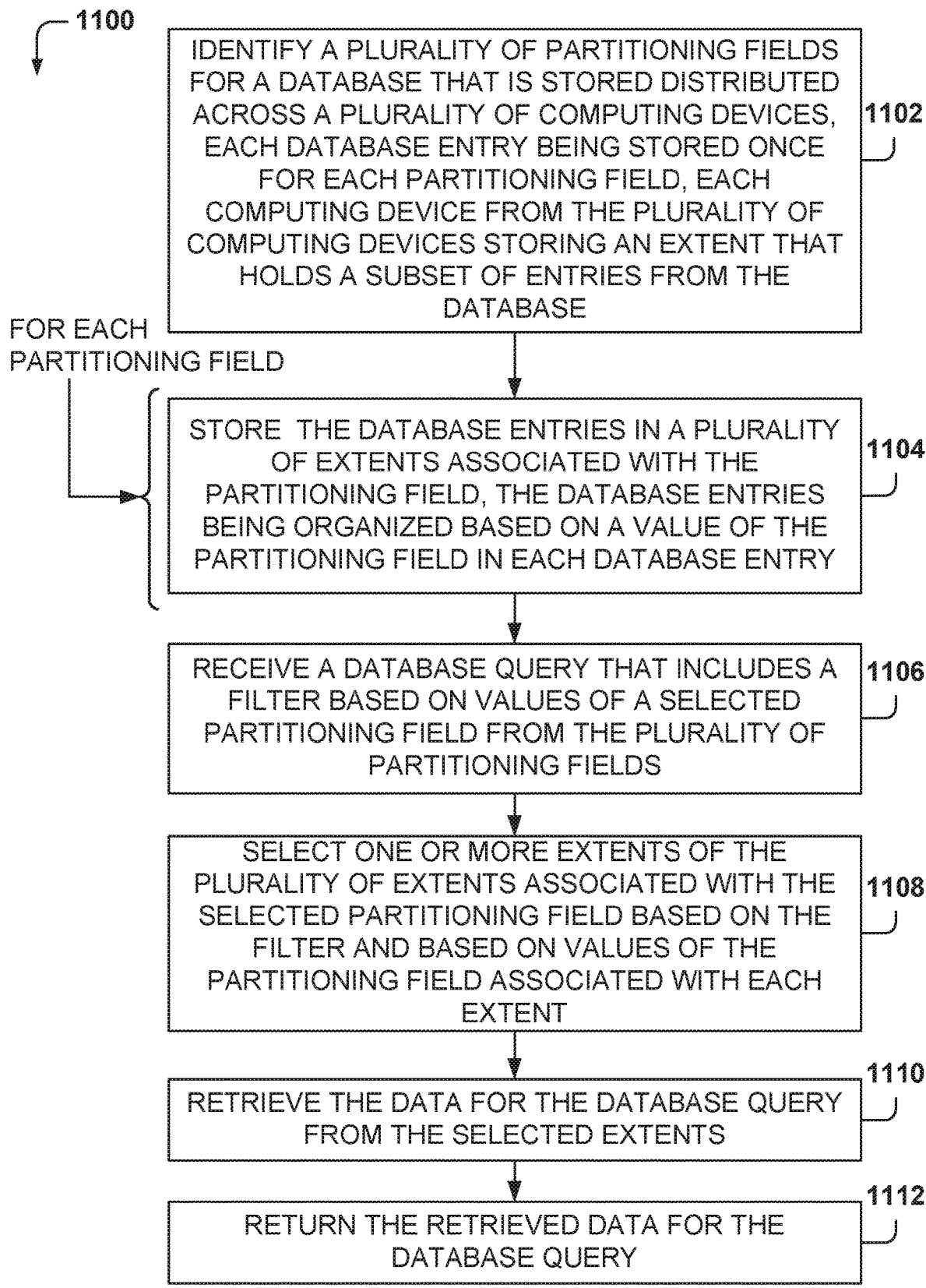
FIG. 11 is a flowchart of a method for structuring a database to support multiple partitioning orders at the storage layer, according to some example embodiments.

FIG. 11 is a flowchart of a method 1100 for structuring a database to support multiple partitioning orders at the storage layer, according to some example embodiments. While the various operations in this flowchart are presented and described sequentially, one of ordinary skill will appreciate that some or all of the operations may be executed in a different order, be combined or omitted, or be executed in parallel.

Operation 1102 is for identifying, utilizing one or more processors, a plurality of partitioning fields for a database that is stored distributed across a plurality of computing devices. Each computing device from the plurality of computing devices stores an extent that holds a subset of entries from the database.

From operation 1102, the method flows to operation 1104, where, for each partitioning field, the one or more processors store the database entries in a plurality of extents associated with the partitioning field, the database entries stored in the plurality of extents for the partitioning field being organized based on a value of the partitioning field in each database entry.

From operation 1104, the method flows to operation 1106 for receiving, by the one or more processors, a database query that includes a filter based on values of a selected partitioning field from the plurality of partitioning fields.

From operation 1106, the method flows to operation 1108 for selecting one or more extents of the plurality of extents associated with the selected partitioning field based on the filter and based on values of the partitioning field associated with each extent;

From operation 1108, the method flows to operation 1110 for retrieving, by the one or more processors, the data for the database query from the selected extents. At operation 1112, the one or more processors return the retrieved data for the database query.

In one example, the database entries stored in the plurality of extents for the partitioning field are organized based on a range of values for the partitioning field, where each extent includes database entries having the value of the partitioning field within the corresponding range for the extent.

In one example, the method 1100 further includes: organizing storage of the database into super-extents, each super-extent including a plurality of extents, wherein all copies of each database entry are stored within a same super-extent; and organizing data stored in each extent associated with the selected partitioning field to be sorted by a second partitioning field.

In one example, the method 1100 further includes: detecting failure of a first computing device storing a first extent associated with the selected partitioning field; and recovering the first extent to be stored in a new computing device, where the recovering includes identifying a third partitioning field that sorts by the selected partitioning field each of the extents associated with the third partitioning field, and transferring data from extents associated with the third partitioning field to recover the first extent.

In one example, the method 1100 further includes: detecting a second database query with a first filter identifying values for the selected partitioning field within a first range and a second filter identifying values for the second partitioning field within a second range; determining extents of the selected partitioning field based on the second database query; and reading from the determined extents based on the values of the second partitioning field.

In one example, the queries based on any of the partitioning fields are processed faster than if only one partitioning field was used to organize storage of the database.

In one example, the method 1100 further includes: tracking queries submitted to the database, determining new partitioning fields based on the queries, and reorganizing storage of the database based on the new partitioning fields.

In one example, the method 1100 further includes providing a user interface for selecting the partitioning fields.

In one example, the method 1100 further includes: caching writes into a solid-state drive (SSD), and transferring a plurality of write entries from the SSD to the corresponding extents.

In one example, the filter defines one or more of a range of values for the selected partitioning field, a selection of a first predetermined number of top values of the selected partitioning field, or a selection of a second predetermined number of bottom values of the selected partitioning field.

In one example, the method 1100 further includes: receiving another database query to perform a join operation of the database with another database, the join operation utilizing as a common key a joining partitioning field from the plurality of partitioning fields that is also a partitioning field for the other database, wherein the extents of the joining partitioning field are collocated for the database and the other database; and performing the join operation by examining the extents for the joining partitioning field.

In one example, the method 1100 further includes pre-computing statistical values at each extent of the selected partitioning field, wherein the statistical values of each extent are composable by combining the statistical values of each extent to obtain overall statistical values that are based on the selected partitioning field.

Figure 12:
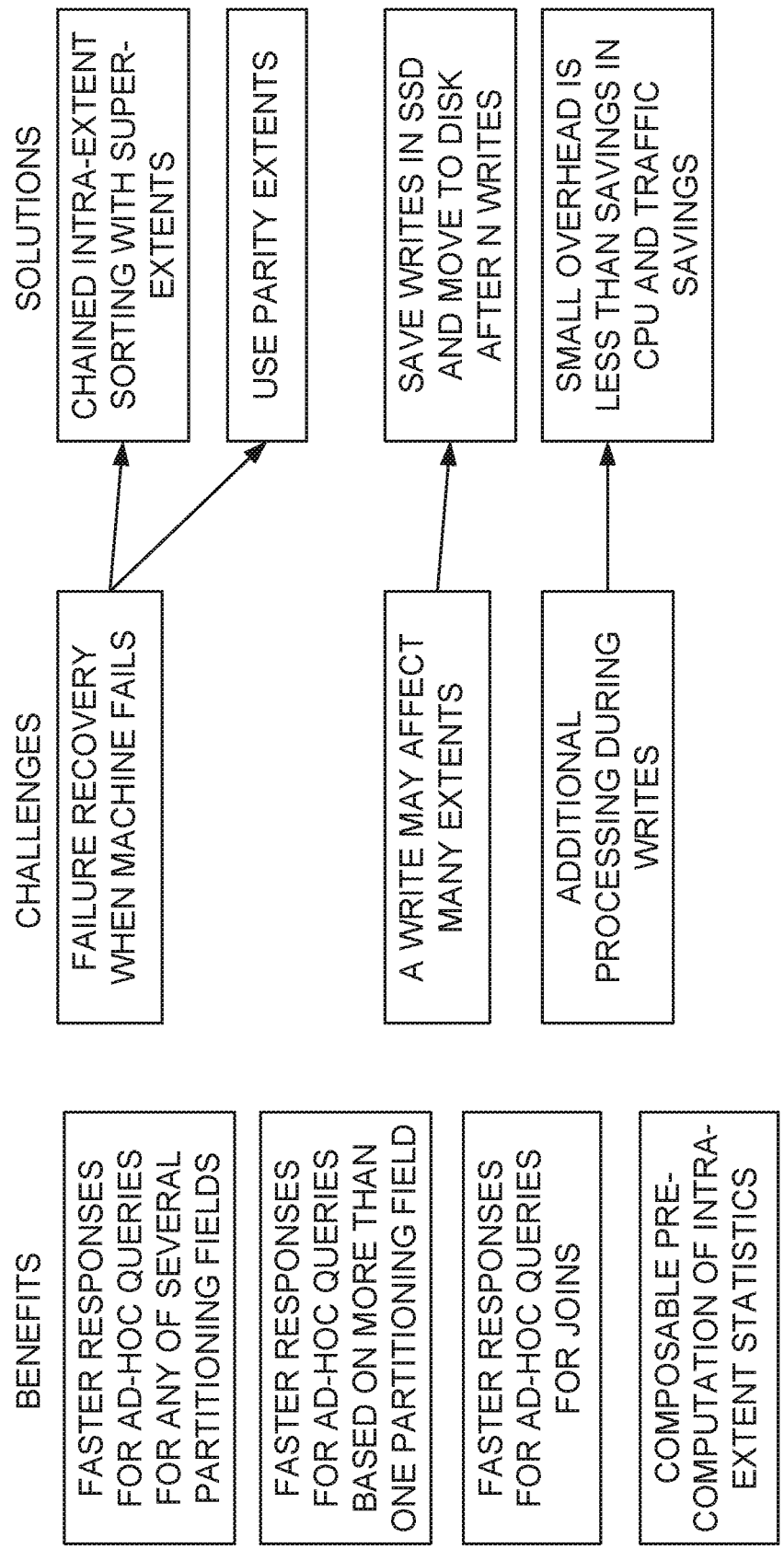
FIG. 12 summarizes some of the benefits, challenges, and solutions for using logical partitioning, according to some example embodiments.

FIG. 12 summarizes some of the benefits, challenges, and solutions for using logical partitioning, according to some example embodiments. The methods described herein provide for multiple database management benefits. The benefits include:

Faster responses for ad hoc queries for any of several partitioning fields. By providing multiple partitioning strategies, the probability that a query may access a small amount of data is greatly increased;

Faster responses for ad hoc queries based on more than one partitioning field;

Faster responses for ad hoc queries for joins; and

Composable pre-computation of intra-extent statistics.

As discussed earlier, logical partitioning raises several challenges:

Failure recovery when a machine fails. To solve this problem, super-extents are defined. In some example embodiments, chained intra-extent sorting, combined with super-extents, is utilized. Further, using parity extents lowers the probability of data loss;

A write may affect many extents. The use of an SSD cache addresses this problem by collecting data for multiple extents and then writing the multiple extents at the same time; and Additional processing during writes. A small overhead in organizing the storage layer results in large savings when retrieving ad hoc queries.

Figure 13:
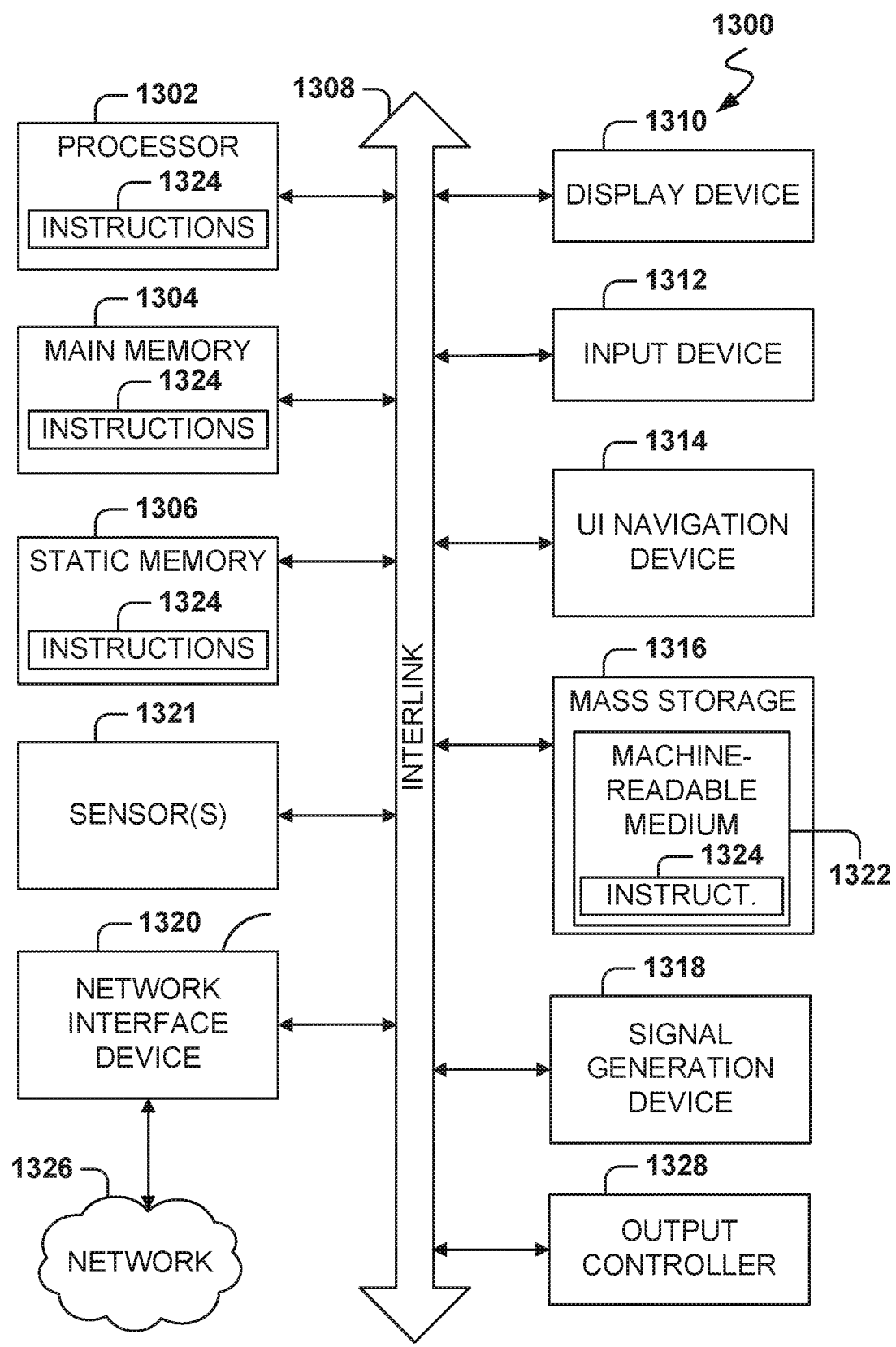
FIG. 13 is a block diagram illustrating an example of a machine upon which one or more example embodiments may be implemented.

FIG. 13 is a block diagram illustrating an example of a machine 1300 upon which one or more example embodiments may be implemented. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a laptop, a mobile telephone, a web appliance, a network router, switch or bridge, or any machine capable of executing instructions (sequential or otherwise) that specify actions to be taken by that machine. Further, while only a single machine 1300 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1300 may include a hardware processor 1302 (e.g., a central processing unit (CPU), a graphics processing unit (GPU), a hardware processor core, or any combination thereof), a main memory 1304, and a static memory 1306, some or all of which may communicate with each other via an interlink (e.g., bus) 1308. The machine 1300 may further include a display device 1310, an alphanumeric input device 1312 (e.g., a keyboard), and a UI navigation device 1314 (e.g., a mouse). In an example, the display device 1310, input device 1312, and UI navigation device 1314 may be a touchscreen display. The machine 1300 may additionally include a mass storage device (e.g., drive unit) 1316, a signal generation device 1318 (e.g., a speaker), a network interface device 1320, and one or more sensors 1321, such as a GPS sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, or within the hardware processor 1302 during execution thereof by the machine 1300. In an example, one or any combination of the hardware processor 1302, the main memory 1304, the static memory 1306, or the mass storage device 1316 may constitute machine-readable media.

While the machine-readable medium 1322 is illustrated as a single medium, the term "machine-readable medium" may include a single medium or multiple media (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that causes the machine 1300 to perform any one or more of the techniques of the present disclosure, or that is capable of storing, encoding or carrying data structures used by or associated with such instructions 1324. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 1302.11 family of standards known as Wi-Fi®, IEEE 1302.16 family of standards known as WiMax®), IEEE 1302.15.4 family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 1324 for execution by the machine 1300, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
identifying, utilizing one or more processors, a plurality of partitioning fields for a database that is stored distributed across a plurality of computing devices each computing device from the plurality of computing devices storing an extent that holds a subset of entries from the database;
for each partitioning field, storing, by the one or more processors, the database entries in a plurality of extents associated with the partitioning field, the database entries stored in the plurality of extents for the partitioning field being organized based on a value of the partitioning field in each database entry;
receiving, by the one or more processors, a database query that includes a filter based on values of a selected partitioning field from the plurality of partitioning fields;
selecting, by the one or more processors, one or more extents of the plurality of extents associated with the selected partitioning field based on the filter and based on values of the partitioning field associated with each extent;
retrieving, by the one or more processors, data for the database query from the selected one or more extents;
returning, by the one or more processors, the retrieved data for the database query;
receiving another database query to perform a join operation of the database with another database, the join operation utilizing as a common key a joining partitioning field from the plurality of partitioning fields that is also a partitioning field for the other database, wherein the extents of the joining partitioning field are collocated for the database and the other database; and
performing the join operation by examining the extents for the joining partitioning field.

2. The method as recited in claim 1, wherein the database entries stored in the plurality of extents for the partitioning field are organized based on a range of values for the partitioning field, wherein each extent includes database entries having the value of the partitioning field within the corresponding range for the extent.

3. The method as recited in claim 1, further comprising:
organizing storage of the database into super-extents, each super-extent including a plurality of extents, wherein all copies of each database entry are stored within a same super-extent; and
organizing data stored in each extent in a chained intra-extent sorting configuration, wherein data stored in each extent associated with the selected partitioning field is sorted by a second partitioning field.

4. A method comprising:
identifying, utilizing one or more processors, a plurality of partitioning fields for a database that is stored distributed across a plurality of computing devices each computing device from the plurality of computing devices storing an extent that holds a subset of entries from the database;
for each partitioning field, storing, by the one or more processors, the database entries in a plurality of extents associated with the partitioning field, the database entries stored in the plurality of extents for the partitioning field being organized based on a value of the partitioning field in each database entry;
receiving, by the one or more processors, a database query that includes a filter based on values of a selected partitioning field from the plurality of partitioning fields;
selecting, by the one or more processors, one or more extents of the plurality of extents associated with the selected partitioning field based on the filter and based on values of the partitioning field associated with each extent
retrieving, by the one or more processors, data for the database query from the selected one or more extents;
returning, by the one or more processors, the retrieved data for the database query
organizing storage of the database into super-extents, each super-extent including a plurality of extents, wherein all copies of each database entry are stored within a same super-extent;
organizing data stored in each extent in a chained intra-extent sorting configuration, wherein data stored in each extent associated with the selected partitioning field is sorted by a second partitioning field;
detecting failure of a first computing device storing a first extent associated with the selected partitioning field; and
recovering the first extent to be stored in a new computing device, wherein the recovering
includes:
identifying a third partitioning field that sorts by the selected partitioning field each of the extents associated with the third partitioning field; and
transferring data from the extents associated with the third partitioning field to recover the first extent.

5. The method as recited in claim 3, further comprising:
detecting a second database query with a first filter identifying values for the selected partitioning field within a first range and a second filter identifying values for the second partitioning field within a second range;
determining extents of the selected partitioning field based on the second database query; and
reading from the determined extents based on the values for the second partitioning field.

6. The method as recited in claim 3, wherein use of super-extents and chained intra-extent sorting enables recovery of a lost extent from one of the partitioning fields from extents in another of the partitioning fields while guaranteeing a same availability and reliability as with physical replication.

7. The method as recited in claim 1, wherein queries based on any of the partitioning fields are processed faster than if only one partitioning field was used to organize storage of the database.

8. The method as recited in claim 1, further comprising:
tracking queries submitted to the database;
determining new partitioning fields based on the queries; and
reorganizing storage of the database based on the new partitioning fields.

9. The method as recited in claim 1, further comprising:
providing a user interface for selecting the partitioning fields.

10. A method comprising:
identifying, utilizing one or more processors, a plurality of partitioning fields for a database that is stored distributed across a plurality of computing devices each computing device from the plurality of computing devices storing an extent that holds a subset of entries from the database;
for each partitioning field, storing, by the one or more processors, the database entries in a plurality of extents associated with the partitioning field, the database entries stored in the plurality of extents for the partitioning field being organized based on a value of the partitioning field in each database entry;
receiving, by the one or more processors, a database query that includes a filter based on values of a selected partitioning field from the plurality of partitioning fields;
selecting, by the one or more processors, one or more extents of the plurality of extents associated with the selected partitioning field based on the filter and based on values of the partitioning field associated with each extent;
retrieving, by the one or more processors, data for the database query from the selected one or more extents;
returning, by the one or more processors, the retrieved data for the database query;
caching writes into a solid-state drive (SSD); and
transferring a plurality of write entries from the SSD to the corresponding extents, wherein cost of logical replication is reduced by storing the plurality of write entries simultaneously.

11. A method comprising:
identifying, utilizing one or more processors, a plurality of partitioning fields for a database that is stored distributed across a plurality of computing devices each computing device from the plurality of computing devices storing an extent that holds a subset of entries from the database;
for each partitioning field, storing, by the one or more processors, the database entries in a plurality of extents associated with the partitioning field, the database entries stored in the plurality of extents for the partitioning field being organized based on a value of the partitioning field in each database entry;
receiving, by the one or more processors, a database query that includes a filter based on values of a selected partitioning field from the plurality of partitioning fields;
selecting, by the one or more processors, one or more extents of the plurality of extents associated with the selected partitioning field based on the filter and based on values of the partitioning field associated with each extent;
retrieving, by the one or more processors, data for the database query from the selected one or more extents;
returning, by the one or more processors, the retrieved data for the database query; and
pre-computing statistical values at each extent of the selected partitioning field, wherein the statistical values of each extent are composable by combining the statistical values of each extent to obtain overall statistical values that are based on the selected partitioning field.

12. The method as recited in claim 1, wherein the filter defines one or more of a range of values for the selected partitioning field, a selection of a first predetermined number of top values of the selected partitioning field, or a selection of a second predetermined number of bottom values of the selected partitioning field.

13. A system comprising:
a memory comprising instructions; and
one or more computer processors, wherein the instructions, when executed by the one or more computer processors, cause the one or more computer processors to perform operations comprising:
identifying a plurality of partitioning fields for a database that is stored distributed across a plurality of computing devices each computing device from the plurality of computing devices storing an extent that holds a subset of entries from the database;
for each partitioning field, storing the database entries in a plurality of extents associated with the partitioning field, the database entries stored in the plurality of extents for the partitioning field being organized based on a value of the partitioning field in each database entry;
receiving a database query that includes a filter based on values of a selected partitioning field from the plurality of partitioning fields;
selecting one or more extents of the plurality of extents associated with the selected partitioning field based on the filter and based on values of the partitioning field associated with each extent;
retrieving data for the database query from the selected one or more extents;
returning the retrieved data for the database query;
receiving another database query to perform a join operation of the database with another database, the join operation utilizing as a common key a joining partitioning field from the plurality of partitioning fields that is also a partitioning field for the other database, wherein the extents of the joining partitioning field are collocated for the database and the other database; and
performing the join operation by examining the extents for the joining partitioning field.

14. The system as recited in claim 13, wherein the database entries stored in the plurality of extents for the partitioning field are organized based on a range of values for the partitioning field, wherein each extent includes database entries having the value of the partitioning field within the corresponding range for the extent.

15. The system as recited in claim 13, wherein the instructions further cause the one or more computer processors to perform operations comprising:

organizing storage of the database into super-extents, each super-extent including a plurality of extents, wherein all copies of each database entry are stored within a same super-extent; and organizing data stored in each extent associated with the selected partitioning field to be sorted by a second partitioning field.

16. A non-transitory machine-readable storage medium including instructions that, when executed by a machine, cause the machine to perform operations comprising:

identifying a plurality of partitioning fields for a database that is stored distributed across a plurality of computing devices each computing device from the plurality of computing devices storing an extent that holds a subset of entries from the database;

for each partitioning field, storing the database entries in a plurality of extents associated with the partitioning field, the database entries stored in the plurality of extents for the partitioning field being organized based on a value of the partitioning field in each database entry;

receiving a database query that includes a filter based on values of a selected partitioning field from the plurality of partitioning fields;

selecting one or more extents of the plurality of extents associated with the selected partitioning field based on the filter and based on values of the partitioning field associated with each extent;

retrieving data for the database query from the selected one or more extents;

returning the retrieved data for the database query;

receiving another database query to perform a join operation of the database with another database, the join operation utilizing as a common key a joining partitioning field from the plurality of partitioning fields that is also a partitioning field for the other database, wherein the extents of the joining partitioning field are collocated for the database and the other database; and performing the join operation by examining the extents for the joining partitioning field.

17. The machine-readable storage medium as recited in claim 16, wherein the database entries stored in the plurality of extents for the partitioning field are organized based on a range of values for the partitioning field, wherein each extent includes database entries having the value of the partitioning field within the corresponding range for the extent.

18. The machine-readable storage medium as recited in claim 16, wherein the machine further performs operations comprising:

organizing storage of the database into super-extents, each super-extent including a plurality of extents, wherein all copies of each database entry are stored within a same super-extent; and organizing data stored in each extent associated with the selected partitioning field to be sorted by a second partitioning field.

19. A non-transitory machine-readable storage medium including instructions that, when executed by a machine, cause the machine to perform operations comprising:

identifying a plurality of partitioning fields for a database that is stored distributed across a plurality of computing devices each computing device from the plurality of computing devices storing an extent that holds a subset of entries from the database;

for each partitioning field, storing the database entries in a plurality of extents associated with the partitioning field, the database entries stored in the plurality of extents for the partitioning field being organized based on a value of the partitioning field in each database entry;

receiving a database query that includes a filter based on values of a selected partitioning field from the plurality of partitioning fields;

selecting one or more extents of the plurality of extents associated with the selected partitioning field based on the filter and based on values of the partitioning field associated with each extent;

retrieving data for the database query from the selected one or more extents;

returning the retrieved data for the database query;

detecting failure of a first computing device storing a first extent associated with the selected partitioning field; and recovering the first extent to be stored in a new computing device, wherein the recovering includes:

identifying a third partitioning field that sorts by the selected partitioning field each of the extents associated with the third partitioning field; and transferring data from extents associated with the third partitioning field to recover the first extent.

* * * * *